Dec. 10, 1940.   F. A. MÖLLER   2,224,355
PROCESS OF DISSOLVING SOLID SUBSTANCES IN LIQUIDS
Filed Dec. 15, 1937
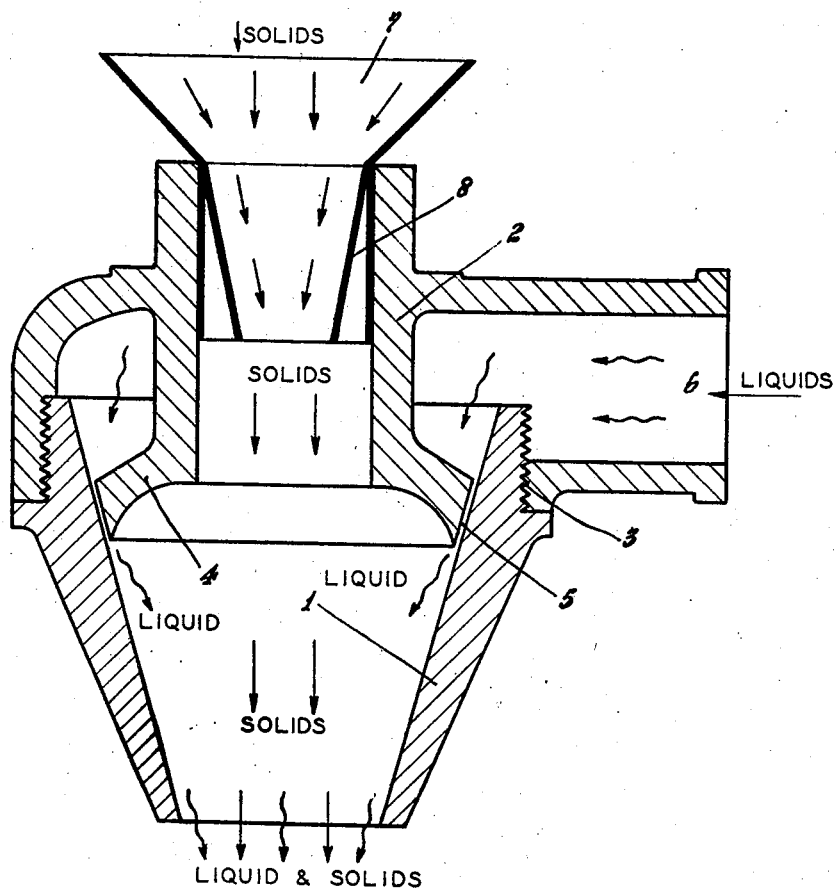
Inventor
F. A. Moller
By
C. F. Wenderoth
Atty Patented Dec. 10, 1940

2,224,355

UNITED STATES PATENT OFFICE 2,224,355

PROCESS OF DISSOLVING SOLID SUBSTANCES IN LIQUIDS

Fredrik André Möller, Groningen, Netherlands, assignor to Naamlooze Vennootschap: W. A. Scholten's Chemische Fabrieken, Groningen, Netherlands, a corporation of the Netherlands Application December 15, 1937, Serial No. 180,045
In the Netherlands September 22, 1937

2 Claims. (Cl. 23—268)

It frequently occurs in practice that more or less finely divided solid materials are to be dissolved in liquids, as a rule water or aqueous solutions. In this connection the term "to dissolve" includes both dissolving the material so as to form ordinary or colloidal solutions, and producing gelatinous solutions, suspensions and the like. In some cases the dissolving process may give rise to difficulties, particularly if the substances to be dissolved are apt to swell up and become sticky, when coming into contact with the liquid. If the dry mass is added to the liquid while agitating the same, the formation of lumps is very likely, especially if large quantities are to be dissolved. This is particularly the case with products such as cold swelling starch.

Various methods have already been proposed in order to avoid this formation of lumps, viz. the addition of certain substances inhibiting lump formation and also mechanical methods. The last mentioned methods are chiefly based on the principle of bringing the liquid during the addition of the solid material into vigorous motion by means of special agitating devices, whereby the particles of the substance are distributed more uniformly throughout the liquid, so that the swollen particles have less opportunity to produce aggregates.

I have found that it is possible to avoid the formation of lumps when dissolving solid materials into liquids in a very simple and inexpensive manner which does not require any mechanical force, by combining the solid material with the liquid while both are in falling motion. The falling mixture is caught in a container from which it may be removed as a uniform solution. If desired the mixture may be slowly agitated in the said container, but in some cases this is unnecessary.

I made the surprising discovery that the contact between the falling solid material and the falling liquid is of such a nature that the particles are uniformly wetted by the liquid and uniformly swell by the action of the same, without any formation of aggregates. The mixture will consequently enter the container free from lumps. If the solid material under the same conditions had been dropped into an agitating vessel without having been previously combined with the falling water, a very intensive formation of lumps would have resulted, even if the process had been carried out with the greatest care.

If desired, means may be applied to render the movement of the solid material and the liquid still more intensive during their fall, but perfectly satisfactory results may be obtained by simply pouring out the two materials into a suitable chamber.

The process may also be carried out continuously. By efficiently controlling the feeding speed of the solid material and the liquid a solution of the desired composition which is entirely free of lumps may be obtained.

According to an embodiment of the invention the falling liquid may move downwardly as a thin film along a wall. The particles of the descending solid material during their fall will contact with the thin film of liquid and will thereby be mixed without forming lumps.

It is of particular advantage to carry out the process in such a way that the falling particles of solid material are forced to traverse a curtain of liquid, whereby each particle is provided with the quantity of liquid necessary for swelling up or dissolving.

The invention also relates to a device for carrying out the process described above. This device is characterized by a chamber in which the falling solid material and the falling liquid are combined a feed opening for the solid material arranged perpendicularly above the said chamber and an inlet for the liquid which is preferably arranged laterally.

A device suitable for the purpose of the invention will now be described with the aid of the drawing representing a vertical section through the said device.

The device comprises two parts 1 and 2 which are screwed together at 3. The lower part is conical and the upper part 2 is provided with an annular part 4, so as to leave a slit-shaped space 5 between this annular part and the conical wall, the width of which may be adjusted by turning the lower conical part. The liquid enters through the inlet 6 which is connected with the upper part 2 and, through the slit 5 and may either flow in a thin film along the wall of the conical part 1, or else form a curtain of water of a conical shape. The solid matter which as a rule is in a finely divided condition, is fed through the opening 7 in which is provided the funnel 8 and while falling downwardly is combined with the liquid. By turning the conical part 1, the width of the slit 5 may be adjusted so as to obtain a solution of the desired composition.

If desired the process can also be controlled by reducing the diameter of the funnel, namely if in manufacturing dilute solutions it is feared that the supply of water will grow too strong when opening the slit still further.

Below the device a container is provided. In this container which is not represented in the drawing the solution is caught and kept in motion, if desired, by moderate agitation.

The invention is to be applied in the first place to cold swelling starches the solution of which often causes great difficulties. It may, however, also be used for dissolving other substances, e. g. glues and gums, such as gum arabic, locust bean gum, dextrine products and the like.

When the device is operated, the water supply is opened first and then the solid material is introduced. If the reverse order is taken, lumps will form in the beginning owing to the fact that the water will contact with a layer of the solid material which has been deposited on the bottom of the agitating vessel or on the wall of the mixing chamber.

If the entire quantity of solid material has passed through the funnel, the funnel is removed from the apparatus and the supply of the liquid is continued for a short time, in order to prevent the swollen material from settling on the wall, which material would have to be removed before the device is used again.

I claim:

1. An apparatus for continuously dissolving a cold swelling starch product in a liquid, comprising a body member having an inlet for said cold swelling starch product extending therethrough and an annular liquid supply chamber surrounding said inlet, an enlarged portion on said inlet constituting the lower boundary of said chamber, said body member being provided with an outlet member adjustably mounted relatively to said inlet, the interior surface of said outlet member being downwardly convergent, said enlarged portion being provided with a downwardly converging exterior surface conforming to the interior surface of the inlet, said downwardly converging surfaces defining therebetween an adjustable liquid passageway whereby a continuous conical film configuration is imparted to the liquid fed between said surfaces, said inlet being located substantially axially of the conical space encompassed by said conical film whereby inflowing solid material falls on said film beyond the extremities of said outlet member.

2. A method of continuously dissolving a solid cold swelling starch product in a liquid, which comprises spreading out a stream of the said liquid into a continuous film having the form of a downwardly convergent conus by supplying the liquid through an adjustable passageway defined by the space between the downwardly convergent inner surface of an outlet member and the juxtaposed correspondingly downwardly convergent outer surface of an inlet member provided with an inlet located substantially axially of said outlet member, and supplying the solid cold swelling starch product through said axially located inlet whereby the inflowing solid cold swelling starch product falls on said conical film beyond the extremities of said outlet member.

FREDRIK ANDRÉ MÖLLER.